(12) United States Patent
Tamura (10) Patent No.: US 8,238,827 B2
(45) Date of Patent: Aug. 7, 2012

(54) INFORMATION PROCESSING APPARATUS (75) Inventor: Toshiya Tamura, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 426 days.

(21) Appl. No.: 12/113,408

(22) Filed: May 1, 2008

(65) Prior Publication Data

US 2008/0311853 A1 Dec. 18, 2008

(30) Foreign Application Priority Data

Jun. 15, 2007 (JP) ................ P2007-159252
Jun. 15, 2007 (JP) ................ P2007-159386

(51) Int. Cl.
*H04B 7/00* (2006.01)
(52) U.S. Cl. .............. 455/41.2; 455/567; 455/569.1
(58) Field of Classification Search ............. 455/41.2
See application file for complete search history.

(56) References Cited

U.S. PATENT DOCUMENTS

| 5,133,004 A | 7/1992 | Heileman, Jr. et al. |
| 5,384,829 A | 1/1995 | Heileman, Jr. et al. |
| 2002/0168970 A1* | 11/2002 | Myojo ............. 455/426 |
| 2002/0186680 A1* | 12/2002 | Takagi et al. .......... 370/349 |
| 2004/0198422 A1* | 10/2004 | Sato ............. 455/552.1 |
| 2007/0281762 A1* | 12/2007 | Barros et al. ........ 455/575.6 |

FOREIGN PATENT DOCUMENTS

| JP | 10107737 A | * 4/1998 |
| WO | WO 2006/106772 | 10/2006 |
| WO | WO 2006/106772 A1 | 10/2006 |

OTHER PUBLICATIONS

Japanese Office Action dated Jan. 14, 2009 issued in counterpart Japanese Patent Application No. 2007-159386.

* cited by examiner

*Primary Examiner* — Temesgh Ghebretinsae
*Assistant Examiner* — Gennadiy Tsvey
(74) *Attorney, Agent, or Firm* — Maschoff Gilmore & Israelsen (57) ABSTRACT

In a mobile telephone device applicable as an information processing apparatus, a protocol layer control unit controls a protocol layer used when a wireless communication is performed with a head set. A command queue puts an execution of a command to the protocol layer in a standby state. A request management unit manages piling up of requests accepted sequentially from the higher level layer in the command queue. A forced interruption unit requests the protocol layer control unit to disconnect a physical connection with the head set in a case where a forced interruption factor is generated. The protocol layer control unit is used to disconnect the physical connection with the head set. When a forced interruption request is accepted, a request management unit does not pile up the forced interruption request in the command queue but executes a forced interruption processing by the forced interruption unit.

15 Claims, 11 Drawing Sheets

INFORMATION PROCESSING APPARATUS

BACKGROUND OF THE INVENTION

1. Field of the Invention

The present invention relates to an information processing apparatus such as a cellular phone connectable to an external device via a short distance wireless link. In particular, the invention relates to an information processing apparatus which can control a connection with the external device and commands to be handled by the protocol layer.

2. Description of the Related Art

In recent years, as a wireless communication technology which can be applied to electronic devices and the like, for example, the Bluetooth standard has been known. When this wireless communication technology according to the Bluetooth is utilized, audio data can be transferred from a cellular phone to an external device such as a head set, for example, without using an audio cable.

As standards of this Bluetooth, Bluetooth Specification version 1.2 (Bluetooth SIG) which is a specification provided with interference measures against a wireless LAN of 2.4 GHz (IEEE 802.11/b/g), Bluetooth Specification version 2+EDR (Bluetooth SIG) which is a specification adopting EDR (Enhanced Data Rate) of a higher speed function, and the like are known.

Incidentally, in a case where, while a disconnection processing of the wireless link is executed between the cellular phone and the head set, a new connection request is issued from a higher level layer, if a connection processing based on the connection request is executed, the disconnection processing which is already in execution collides with the connection processing. Thus, the connection processing may fail to be appropriately executed. On the other hand, in a case where a connection based on a physical layer remains, by utilizing this connection, a connection based on a logical layer can be established and kinds of commands are transferred via the logical connection. Here, in a case that a plurality of commands is issued while a processing is executed, the pluralities of commands are stored in a queue buffer, e.g. a FIFO buffer. However, if one of the pluralities of commands is for canceling the processing already executed on the basis of the previous command, the canceling processing may be delayed.

In this way, there is a problem that it is difficult to appropriately execute the processing based on the command.

On the other hand, for example, as an electric field intensity between the cellular phone and the head set is decreased, a response with respect to the connection request transmitted from the cellular phone to the head set may not be easily received in some cases (that is, in usual cases, the response can be received in one second, but it takes two to three seconds to receive the response). For example, an authentication using a PIN code, which is inputted by a user, is carried out when a connection is established with the head set. However, under the weak electric field condition between the cellular phone and the head set, this authentication processing cannot be smoothly performed and sometimes may stand by until the authentication processing is completed. In such a case, even when a disconnection request is desired to be carried out from the cellular phone, there is a problem that the connection between the two devices cannot be disconnected immediately.

In particular, in the case of the cellular phone, there is a problem that a user may have an inconvenience in operating the cellular phone, if the connection between the cellular phone and the head set cannot be disconnected immediately when an incoming call is received at the cellular phone.

SUMMARY OF THE INVENTION

According to one embodiment of the present invention, an information processing apparatus is provided, which comprises a session control unit which controls a physical connection and a logical connection with an external device; a buffer memory which stores a plurality of commands to be handled by the session control unit; a request management unit which manages the commands; and an interruption unit which requests the session control unit to disconnect a physical connection if a predetermined factor is detected, wherein the request management unit skips to store a command which issued by the interruption unit when the interruption unit detects that the predetermined factor is occurred, and the session control unit disconnects the physical connection.

According to another embodiment of the present invention, an information processing apparatus is provided, which comprises a session control unit which controls a physical connection and a logical connection with an external device; a buffer memory which stores a plurality of commands to be handled by the session control unit; and a request management unit which manage the commands, wherein the request management unit does not store a command, which is issued while the session control unit executes disconnection processing responding to a disconnection request requesting disconnection of the physical and logical connection with the external device, into the buffer memory.

According to still another embodiment of the present invention, an information processing apparatus is provided, which comprises a first connection management unit which manages a first connection in accordance with a first protocol; a second connection management unit which manages a second connection in accordance with a second protocol; a signal level detector which detects signal level between the information processing apparatus and an external device connected under the control of the first and second connection management units; an interruption unit which instructs the first connection management unit to disconnect the first connection with the external device if a predetermined factor is detected while the signal level detector detects that the signal level between the information processing apparatus and the external device decreases under a predetermined level; and a notification unit which notifies the second connection management unit that the first connection with the external device is disconnected if the first connection management unit disconnects the first connection responding to the instruction issued by the interruption unit.

DESCRIPTION OF THE PREFERRED EMBODIMENTS

Hereinafter, embodiments of the present invention will be described with reference to the drawings.

First Embodiment

Figure 1:
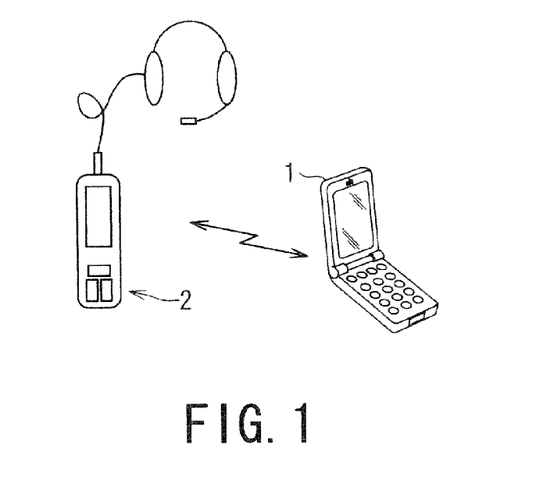
FIG. 1 is a schematic configuration diagram of an information exchange system according to an embodiment of the present invention.

As illustrated in FIG. 1, in a vicinity of a cellular phone 1, a head set 2 which can be applied as an opposite device according to the embodiment of the present invention is arranged. The head set 2 receives audio data transferred from the cellular phone 1 by using a wireless communication (for example, Bluetooth or the like) and can reproduce the audio data in approximately real time. It should be noted that as the opposite device, an in-vehicle device or the like may be used other than the head set 2.

Figure 2:
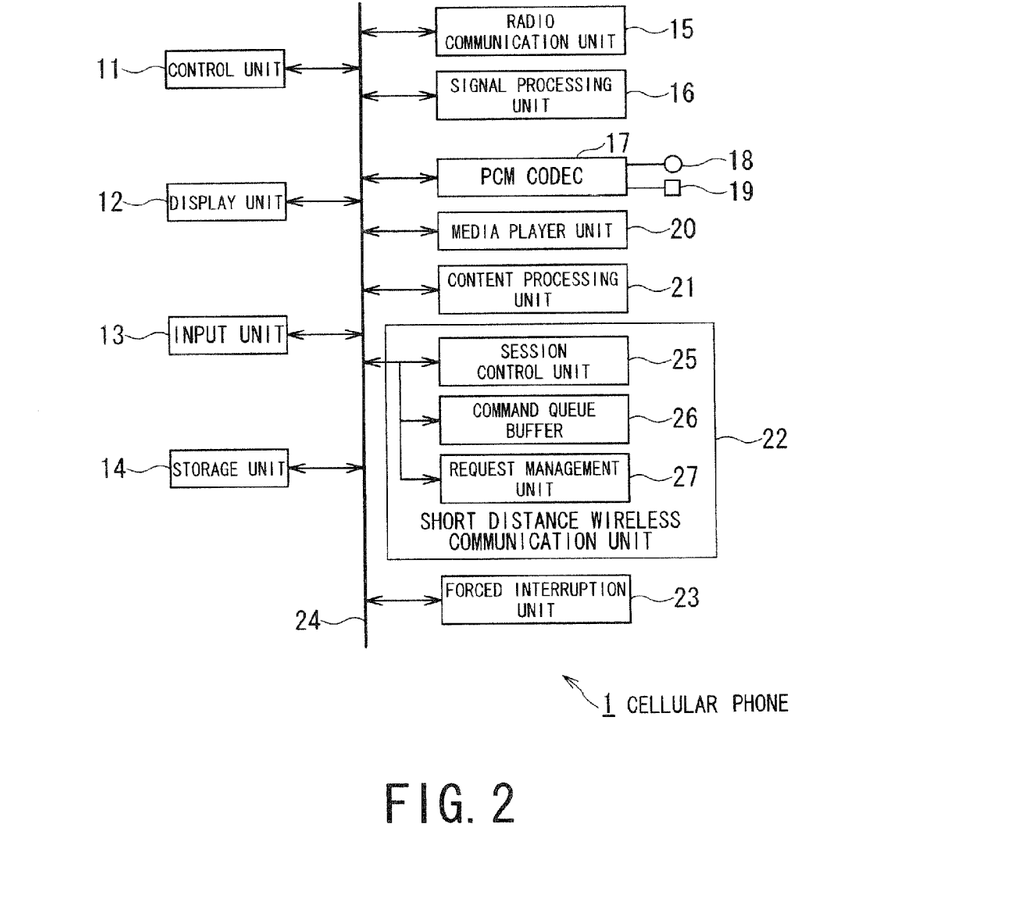
FIG. 2 is a block diagram of an inner configuration of a cellular phone according to an embodiment of the present invention.

FIG. 2 illustrates an exemplary inner configuration of the cellular phone 1 of FIG. 1. As illustrated in FIG. 2, the cellular phone 1 is configured of a control unit 11, a display unit 12, an input unit 13, a storage unit 14, a radio communication unit 15, a signal processing unit 16, a PCM code 17, a microphone 18, a speaker 19, a media player unit 20, a content processing unit 21, a short distance wireless communication unit 22, and a forced interruption unit 23, which are mutually connected via a bus 24.

The control unit 11 is configured of a CPU (Central Processing unit), a ROM (Read Only Memory), a RAM (Random Access Memory), and the like. The CPU performs various processings in accordance with a program stored in the ROM or various application programs loaded from the storage unit 14 onto the RAM. Also, the CPU generates various control signals to be supplied to the respective units, thus controlling the cellular phone 1 in an overall manner. The RAM stores data which is necessary for the CPU to execute various processing.

The display unit 12 is configured, for example, of a LCD (Liquid Crystal Display) and the like. The input unit 13 is configured of a plurality of alphanumeric keys, function keys, and a power key and the like.

The radio communication unit 15 receives a radio signal transmitted from a base station via an antenna and generates an intermediate frequency signal by down-converting the received radio signal. Furthermore, the radio communication unit 15 may perform a quadrature demodulation processing, despreading and synthesis processings for each path from a RAKE receiver. After that, reception packet data output from the radio communication unit 15 is input to the signal processing unit 16.

The signal processing unit 16 is configured, for example, of a DSP (Digital Signal Processor). The signal processing unit 16 is a speech codec for encoding and decoding the speech signal transmitted and received via the radio communication unit 15.

Then, a digital speech signal obtained through the decoding processing is PCM-decoded by the PCM codec 17, and thereafter amplified to be output by the speaker 19. On the other hand, a speech signal input from the microphone 18 is converted into a digital speech signal by the PCM codec 17 to be input to the speech codec.

The media player unit 20 has a music control function for reproducing the audio data, for example.

The content processing unit 21 has an encoding function and a decoding function. If coded audio data is received from the media player unit 20, the content processing unit 21 decodes the coded audio data according to a coding method such as ACC, aacPlus, MP3, ATRAC, or SBC. Also, if needed, the content processing unit 21 re-encodes the audio data, which is obtained by decoding the coded audio data.

In addition, if the cellular phone 1 may have a terrestrial digital one-segment broadcasting receiver. In this case, received broadcasting signal is divided into audio packets and video packets at the terrestrial digital one-segment broadcasting receiver. And thereafter the content processing unit 21 decodes coded audio data extracted from the audio packets and video data extracted from the video packets. The MPEG4 and H.264 standard is generally used for the video data, therefore, the content processing unit 21 decodes the coded video data according to the MPEG4 or H.264 method.

The short distance wireless communication unit 22 is configured of, for example, a module which performs a wireless communication according to the Bluetooth protocols. The short distance wireless communication unit 22 performs the wireless communication with the head set 2 existing in the vicinity of the cellular phone 1. It should be noted that wireless communications method other than the Bluetooth (for example, an infrared communication) may also be used. The short distance wireless communication unit 22 is mainly configured of a session control unit 25, a command queue buffer 26, and a request management unit 27.

The session control unit 25 controls a short distance wireless communication with the head set 2. In particular, the session control unit 25 manages not only a (first) connection based on the physical layer protocols in the short distance wireless communication performed with the head set but also a (second) connection based on the logical layer protocols in the short distance wireless communication performed with the head set 2.

The command queue buffer 26 queues commands (requests) to be handled by the physical layer protocols and/or the logical layer protocols. When the request management unit 27 receives the commands from the upper layer such as an application layer or the API (Application Program Interface) layer, the request management unit 27 stores the commands into the command queue buffer 26.

Under a weak electric field condition which occurs in case that the distance between the cellular phone 1 and the head set 2 becomes large, when an interruption factor such as an incoming call is detected, the interruption unit 23 instructs the session control unit 25 to disconnect the first connection with the head set 2, thus forcibly the first connection with the head set 2 is disconnected.

Incidentally, when an electric field intensity between the cellular phone 1 and the head set 2 is decreased and the weak electric field condition is accordingly caused between the cellular phone 1 and the head set 2, a response with respect to the connection request transmitted from the cellular phone 1 to the head set 2 may not be easily received in some cases. For example, in usual cases, the response can be received in one second, but it takes two to three seconds to receive the response. In such a case, even when a disconnection request is desired to be carried out from the cellular phone 1, the connection between the cellular phone 1 and the head set 2 cannot be disconnected immediately.

In view of the above, without carrying out the usual disconnection procedure of the second connection by the session control unit 25, the first connection with the head set 2 is forcibly disconnected. With this configuration, even under the weak electric field condition with the head set 2, when the interruption factor is detected, the connection with the head set 2 can be disconnected immediately.

Figure 3:
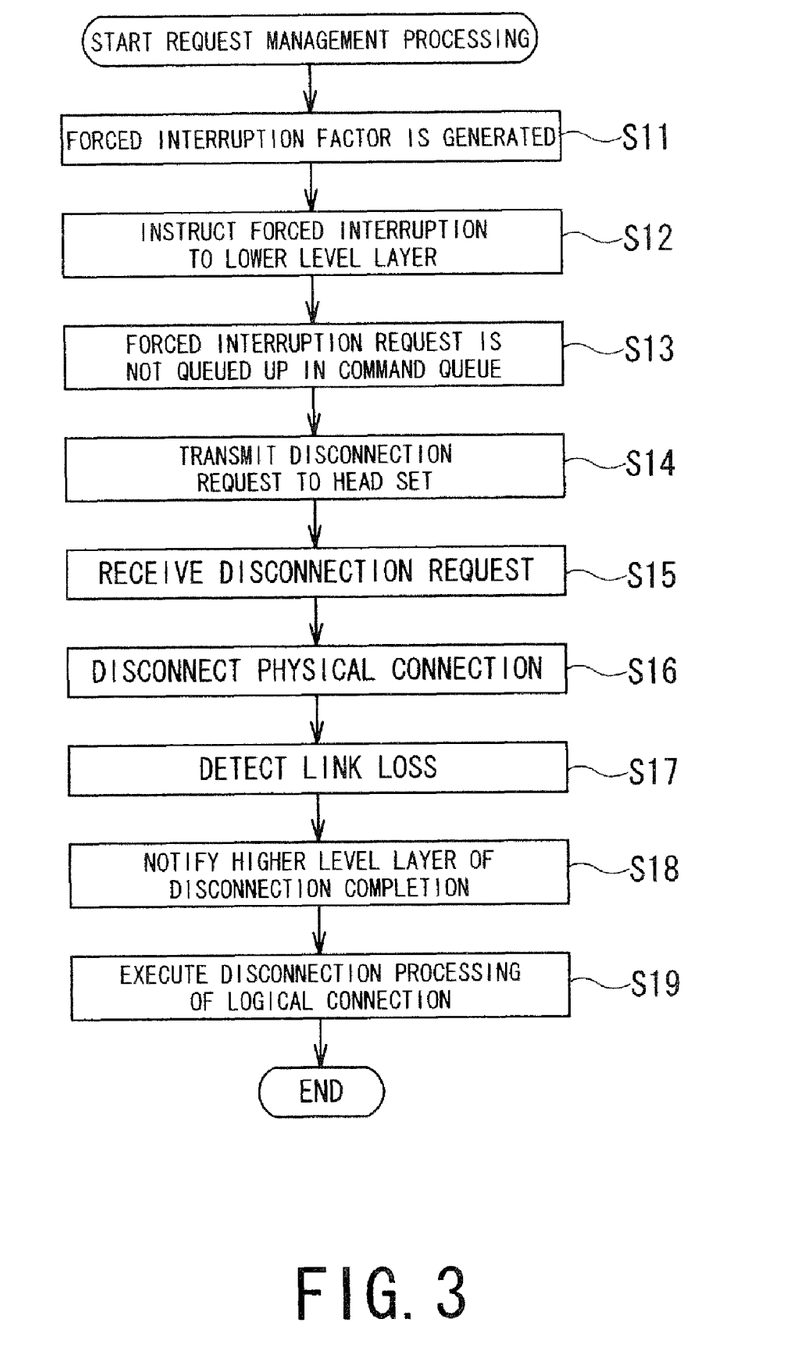
FIG. 3 is a flowchart for describing a request management processing in the cellular phone of FIG. 2.
Figure 4:
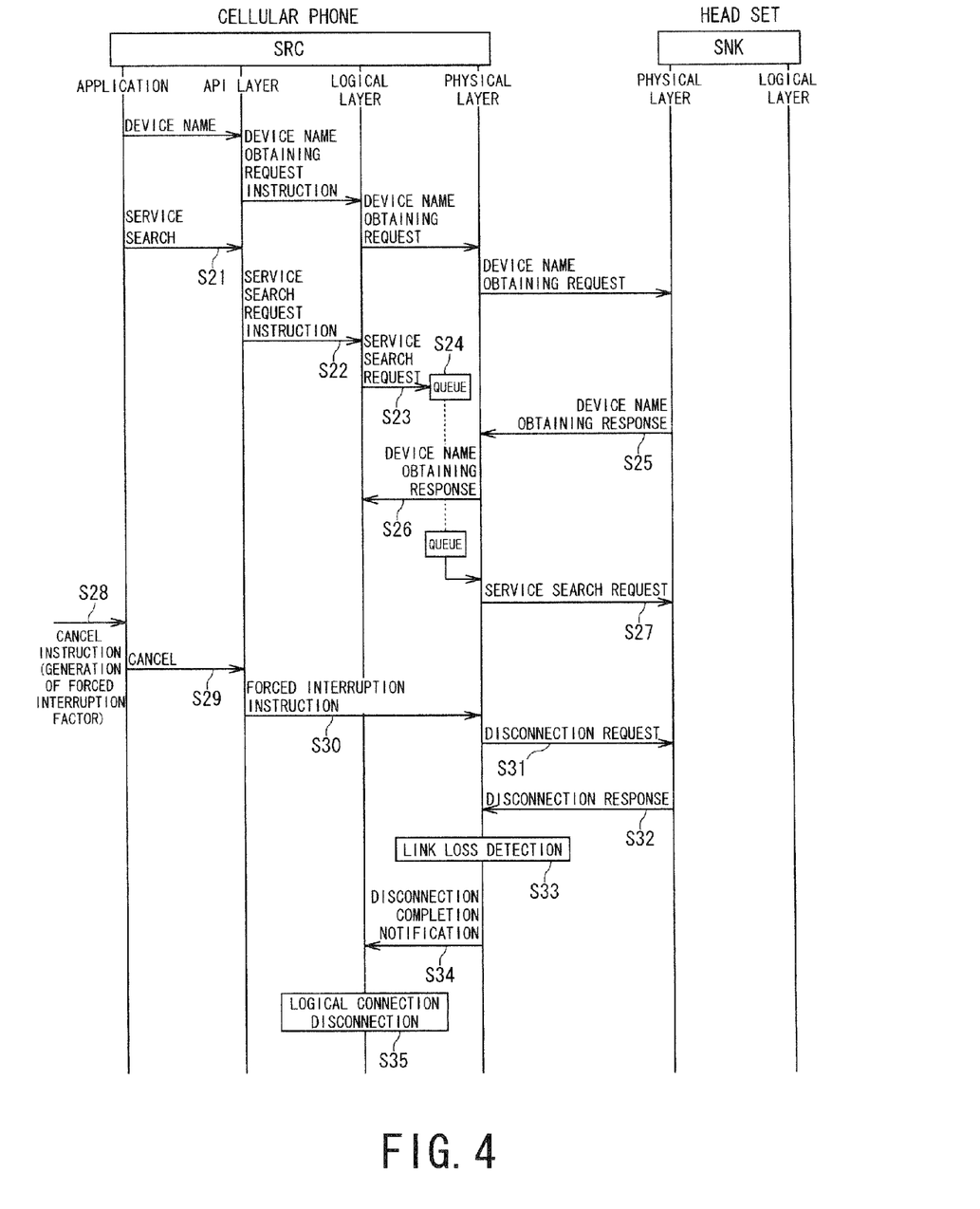
FIG. 4 is a sequence chart for describing a specific sequence performed between the cellular phone and the head set when the request management processing which is described with reference to the flowchart of FIG. 3 is executed.

Here, with reference to a flowchart of FIG. 3, a request management processing executed in the cellular phone shown in FIG. 2. This forced interruption processing is initiated when an interruption factor such as a canceling instruction for the running processing based on the request is generated. FIG. 4 illustrates a detailed processing, according to a flowchart shown in FIG. 3, executed between the cellular phone 1 and the head set 2.

In step S11, while a connection between the cellular phone 1 and the head set 2 is established, the interruption factor based on an incoming call (a forced interruption instruction) is generated. To be more specific, as illustrated in FIG. 4, when a service search request, which inquires service information executable at the head set 2, is transmitted to the head set 2 is issued by an application layer, a service search command is transmitted from the short distance wireless communication unit 22 to the head set 2. Then, the cellular phone 1 awaits a response to the service search command (steps S21 to S27 of FIG. 4). In this condition, when a forced interruption factor such as an incoming call is occurred, a disconnection request is issued by the application layer (step S28 of FIG. 5). At this time, from the application layer controlled by the control unit 11, the disconnection request, which is a request for disconnecting the first connection, is transmitted to the forced interruption unit 23 (step S29 of FIG. 5).

In step S12, when the forced interruption unit 23 receives the disconnection request, the forced interruption unit 23 determines that the forced interruption factor. Then, the forced interruption unit 23 issues a disconnection command to the short distance wireless communication unit 22 to disconnect the first connection with the head set 2. When the disconnection request is received at the short distance wireless communication unit 22, the request management unit 27 notes that the received request is a forced interruption instruction and skips to queue the disconnection request into the command queue buffer 26 (step 13 of FIG. 3). Subsequently, the request management unit 27 transfers the received disconnection request to the session control unit 25 (step S30 of FIG. 4). Then, the session control unit 25 forcibly disconnects the first session established between the cellular phone 1 and the head set 2 (step 30 of FIG. 4).

Figure 5:
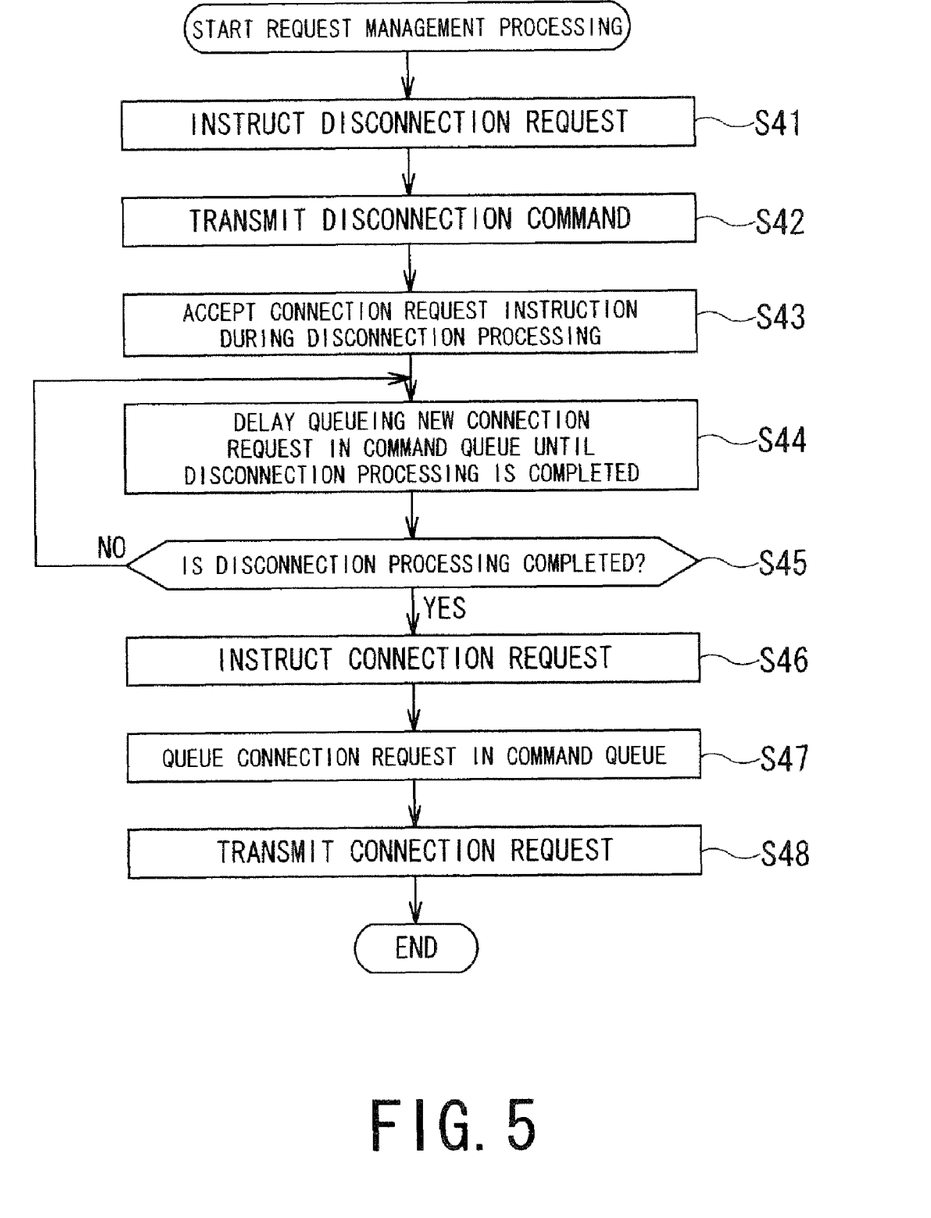
FIG. 5 is a flowchart for describing another request management processing in the cellular phone of FIG. 2.

In step S14, in accordance with the disconnection request from the forced interruption unit 23, the session control unit 25 transmits a disconnection command for requesting a disconnection of the first connection between the cellular phone 1 and the head set 2 via the short distance wireless communication unit 22 to the head set 2 (step S31 of FIG. 5). At this time, the disconnection command is transmitted to the head set 2, and also a notification indicating that this disconnection is a normal disconnection is transmitted to the head set 2. With this configuration, even when the forced disconnection of the first connection by the forced interruption unit 23 is executed, the head set 2 can recognize that this disconnection is a normal disconnection.

In step S15, the short distance wireless communication unit 22 receives a disconnection response which is a response corresponding to the disconnection command from the head set 2. Then, in step S16, the first connection between the cellular phone 1 and the head set 2 is forcibly disconnected. In step S17, the session control unit 25 detects thereafter a link loss which is a state where the first connection with the head set 2 is disconnected, and in step S18, in a case where the link loss (the state where the first connection with the head set 2 is disconnected) is detected, the logical layer functioning as the higher level layer is notified of a completion of the disconnection of the first connection (steps S33 and S34 of FIG. 4).

After that, in step S19, in accordance with the notification of the completion of the disconnection of the first connection from the logical layer, the session control unit 25 disconnects the second connection, according to the logical layer protocols, between the cellular phone 1 and the head set 2 (step S35 of FIG. 4).

According to the embodiment of the present invention, the commands to be executed based on the physical and logical layer protocols are controlled according to the characteristics of the commands. That is, if the command is based on the request in accordance with the forced interruption instruction, the command is not queued in the command queue buffer 26. Therefore, the forced interruption processing can be executed by the forced interruption unit 23 immediately.

With this configuration, while a connection between the cellular phone 1 and the head set 2 is established, if the interruption factor based on an incoming call (a forced interruption instruction) is generated, the disconnection processing can be executed immediately without queuing the disconnection command into the command queue buffer 26. Consequently, the connection with the head set 2 can be disconnected immediately. As a result, it is possible to improve the usability when the short distance wireless communication is performed between the cellular phone 1 and the head set 2.

It should be noted that the incoming call interruption is explicitly described as the forced interruption factor, but the forced interruption factor is not limited to the above-mentioned case. For example, the present invention can also be applied to a case where another forced interruption factor such as cancel request which cancels the previous request or stop request.

On the other hand, if a new connection request is issued from the higher level layer (the application layer or the API layer) while executing the disconnection processing of the connection between the cellular phone 1 and the head set 2, the new connection request may collide with the disconnection processing. In this case, the connection processing initiated responding to the new connection request may fail to be appropriately executed.

In view of the above, when the requests are sequentially issued at the higher level layer (the application layer or the API (Application Program Interface) layer), it is important to not only determines whether each request should be queued into the command queue buffer 26 according to the characteristic of the respective requests, but also delay the each request from queuing according to the characteristic of the respective requests. With this configuration, it is possible to further preferably manage queuing the requests issued by the higher level layer into the command queue. As a result, it is possible to preferably execute the processing based on the requests in accordance with the characteristic and the execution status of the processing when the wireless communication is performed with the head set 2. Hereinafter, the request management processing using this method will be described.

With reference to a flowchart of FIG. 5, a description will be given of another request management processing in the cellular phone 1 of FIG. 2. It should be noted that FIG. 6 illustrates a sequence of a specific processing between the cellular phone 1 and the head set 2 when the request management processing which is described with reference to the flowchart of FIG. 5 is executed.

Figure 6:
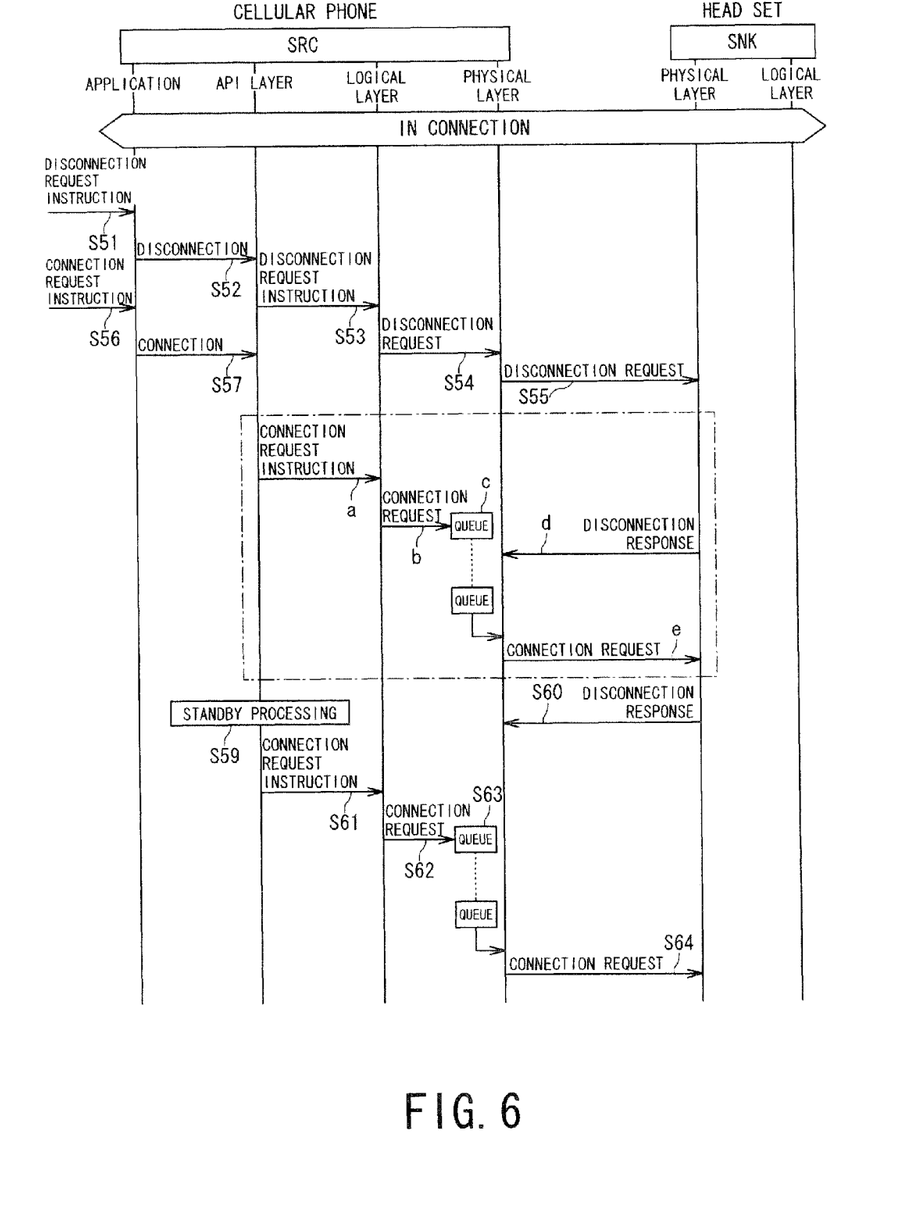
FIG. 6 is a sequence chart for describing a specific sequence performed between the cellular phone and the head set when the request management processing which is described with reference to the flowchart of FIG. 5 is executed.

In step S41, when the disconnection request is instructed by the user by manipulating the input unit 13, the control unit 11 transmits a disconnection request to the session control unit 25 (steps S51 to S54 of FIG. 6).

In step S42, the session control unit 25 transmits the disconnection command for requesting a disconnection of the first connection based on the physical layer protocols between the cellular phone 1 and the head set 2 via the short distance wireless communication unit 22 to the head set 2. In accordance with the management of the session control unit 25, the short distance wireless communication unit 22 transmits this disconnection command (the disconnection request for requesting the disconnection of the first connection between the cellular phone 1 and the head set 2) to the head set 2 (step S55 of FIG. 6).

Next, in step S43, as the user manipulates the input unit 13 to issue a new connection request, the control unit 11 accepts the connection request instruction during the disconnection processing (step S56 of FIG. 6). Subsequently, the connection request is transferred to the API layer from the application layer under the control of the control unit 11 (step S57 of FIG. 6).

At this time, in the related art, when the new connection request is transferred to the API layer from the application layer under the control of the control unit 11, the new connection request is immediately made from the API layer to the session control unit 25, and the connection processing based on the connection request is executed in the session control unit 25 (steps a to e in FIG. 6). In general, the new connection request is executable if the first connection exists. However, in a case where the previous processing is the disconnection request, even if the processing completion is waited for on the premise that the first connection exists, the first connection disappears as the result of the completion of the previous disconnection processing. Eventually, this connection request fails indirectly due to the previous disconnection processing.

In view of the above, in step S44, the request management unit 27 delays queuing the new connection request in the command queue buffer 26 until the disconnection processing based on the disconnection command is completed (step S59 of FIG. 6). In step S45, the request management unit 27 receives the disconnection response from the head set 2 via the short distance wireless communication unit 22 to determine whether the disconnection processing is completed. The queuing of the connection request into the command queue buffer 26 is delayed until it is determined that the disconnection processing is completed.

In step S45, in a case where it is determined that the disconnection processing is completed, in step S46, the connection request is transferred from the API layer to request management unit 27, and the request management unit 27 queues the connection request in the command queue buffer 26 in step S47 (in step S60 to S63 of FIG. 6).

In step S48, the session control unit 25 transmits a connection command based on the new connection request for requesting a connection between the cellular phone 1 and the head set 2 via the short distance wireless communication unit 22 to the head set 2. In accordance with the management of the session control unit 25, the short distance wireless communication unit 22 transmits this connection command to the head set 2 (step S64 of FIG. 6).

With this configuration, it is possible to avoid the following situation that the connection processing based on the new connection request fails due to the collision between the running disconnection processing and the connection processing initiated responding to the new connection request. Thus, it is possible to further preferably manage to queue the requests accepted from the higher level layer into the command queue buffer 26. Therefore, and in accordance with the characteristic and the execution status of the processing executed when the wireless communication is carried out with the head set 2, it is possible to preferably execute the processing based on the instructed request. As a result, it is possible to improve the usability when the short distance wireless communication is performed between the cellular phone 1 and the head set 2.

It should be noted that in a case where a request other than the connection request is accepted from the higher level layer during the execution of the disconnection processing, without temporarily delaying the queuing the subsequent requests into the command queue 26, the next request may be instructed to the lower level layer to execute a processing based on the request.

Second Embodiment

Next, a second embodiment of the present invention will be described.

Figure 7:
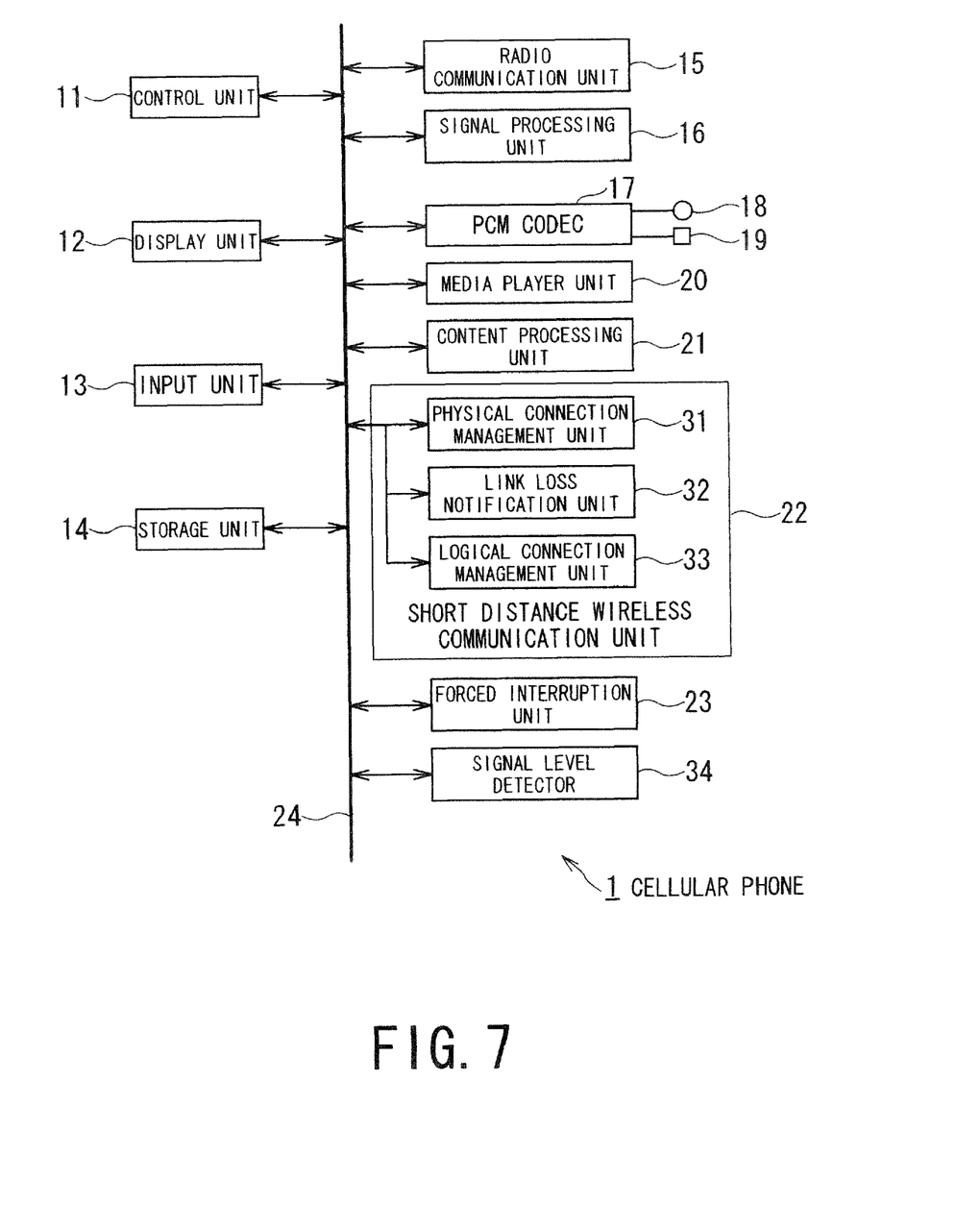
FIG. 7 is another block diagram of an inner configuration of a cellular phone according to an embodiment of the present invention.

FIG. 7 illustrates another inner configuration of the cellular phone 1 of FIG. 1. It should be noted that the configuration of the mobile telephone device 1 of FIG. 2 is similar to the above, and a description thereof will be omitted to avoid the repetition.

The short distance wireless communication unit 22 is mainly configured of a physical connection management unit 31, a link loss notification unit 32, and a logical connection management unit 33.

The physical connection management unit 31 manages a physical connection according to a physical layer protocols. The link loss notification unit 32 detects a link loss which is a state of a connection loss with the head set 2 occurred under a weak electric field situation caused when, for example, the distance between the cellular phone 1 and the head set 2 becomes large (a state where the physical connection with the head set 2 is disconnected). Also, in a case where the link loss (the state where the physical connection with the head set is disconnected) is detected, the link loss notification unit 32 notifies the logical connection management unit 33 that the link loss occurs. The logical connection management unit 33 manages a logical connection based on the logical layer protocols.

In a case where a forced interruption factor such as an incoming interruption is generated under a weak electric field situation where the distance between the cellular phone 1 and the head set 2 becomes large, for example, the forced interruption unit 23 instructs the session control unit 25 to execute the disconnection of the physical connection with the head set 2 with which the cellular phone 1 is connecting, thus forcibly disconnecting the physical connection with the head set 2.

A signal level detector 34 detects signal level between the cellar phone 1 and the head set 2 under the control of the physical connection management unit 31 and the logical connection unit 33, and if needed, detects that the signal level between the cellar phone 1 and the head set 2 decreases under a predetermined value.

Figure 8:
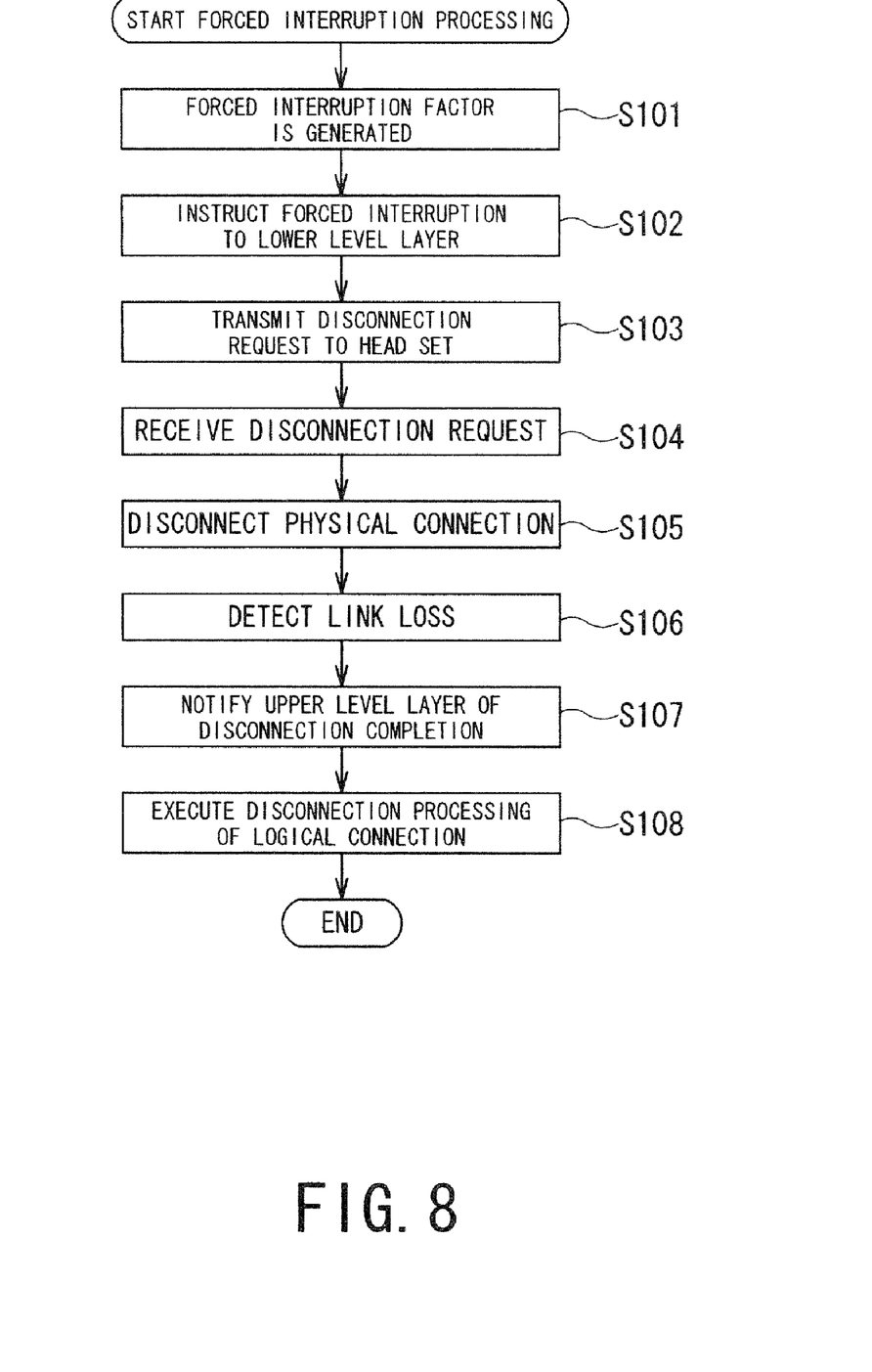
FIG. 8 is a flowchart for describing a forced interruption processing in the cellular phone of FIG. 7.

Next, with reference to a flowchart of FIG. 8, a description will be given of a forced interruption processing in the cellular phone 1 of FIG. 7. This the forced interruption processing is initiated in a case where the forced interruption factor such as the incoming interruption is generated under the weak electric field situation where the distance between the cellular phone 1 and the head set 2 becomes large, for example. It should be noted that FIG. 9 illustrates a sequence of a specific processing between the cellular phone 1 and the head set 2 when the forced interruption processing described with reference to the flowchart of FIG. 8 is executed.

In step S101, when the condition is under the weak electric field condition where the distance between the cellular phone 1 and the head set 2, while a connection between the cellular phone 1 and the head set 2 is established, the forced interruption factor such as the incoming interruption is generated.

Figure 9:
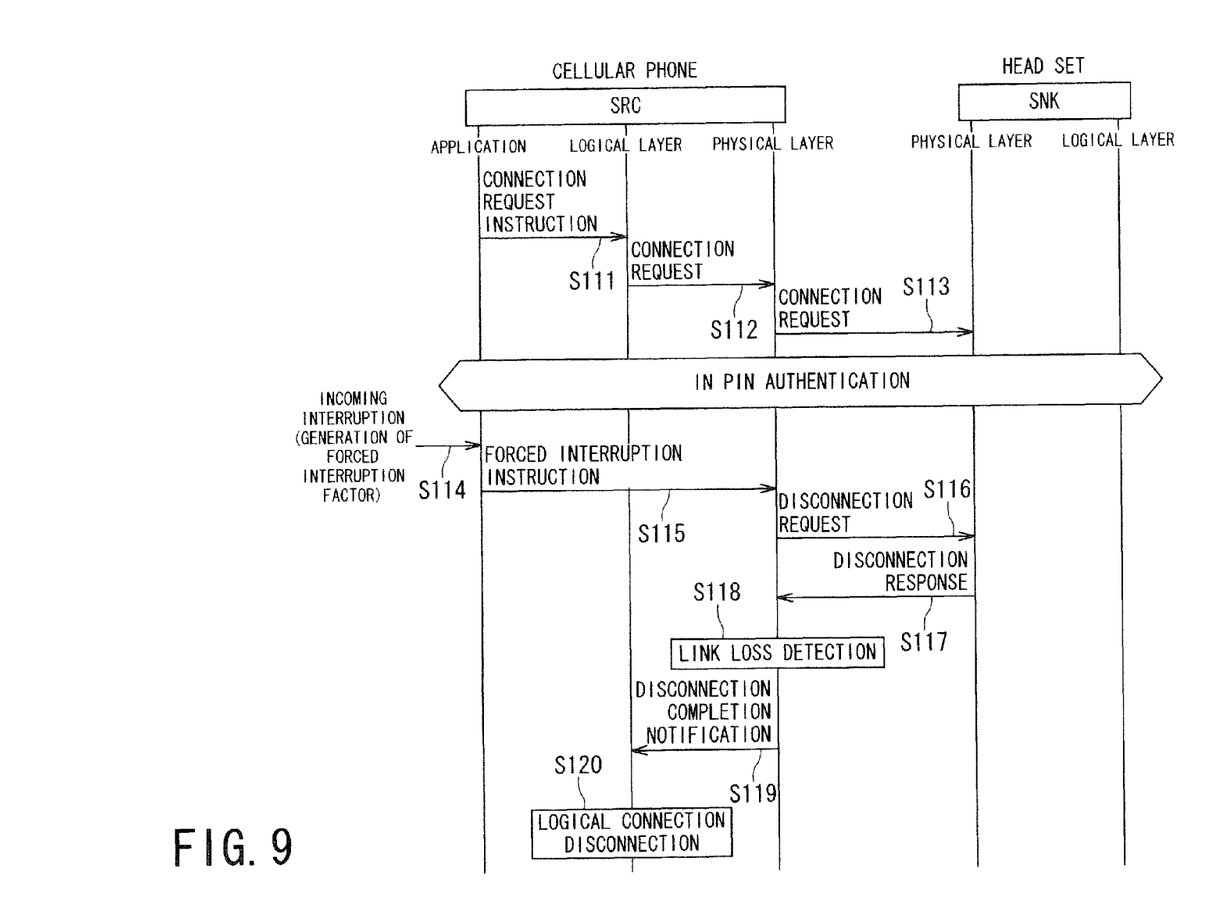
FIG. 9 is a sequence chart for describing a specific sequence performed between the cellular phone and the head set when the forced interruption processing which is described with reference to the flowchart of FIG. 8 is executed.

To be more specific, as illustrated in FIG. 9, when a connection processing with the head set 2 is initiated responding to an instruction inputted by the user by manipulating the input unit 13, under the control of the control unit 11, a connection request is transferred to the logical connection management unit 33 from the application layer. Next, the connection request is transferred from the logical connection management unit 33 to the physical connection management unit 31. In accordance with the management of the physical connection management unit 31, a connection command based on the connection request is transmitted from the short distance wireless communication unit 22 to the head set 2 (steps S111 to S113 of FIG. 9). After that, by using the same PINs (authentication keys) respectively included in the connection request and a connection response, a PIN authentication is respectively carried out between the cellular phone 1 and the head set 2.

Herein, when the condition is under the weak electric field condition where the distance between the cellular phone 1 and the head set 2, when the PIN authentication is not completed on the head set 2 yet, the forced interruption factor such as the incoming interruption is generated (step S114 of FIG. 9).

In step S102, under the weak electric field condition caused when, for example, the distance between the cellular phone 1 and the head set 2 becomes large, in a case where the forced interruption factor such as the incoming call interruption is generated from other cellular phone, the forced interruption unit 23 issues the disconnection request for disconnecting the physical connection with the head set 2 to the physical connection management unit 31 to forcibly disconnect the physical connection with the head set 2 (step S115 of FIG. 9).

In step S103, in accordance with the forced interruption instruction from the forced interruption unit 23, the physical connection management unit 31 transmits a disconnection command for requesting a disconnection of the physical connection between the cellular phone 1 and the head set 2 via the short distance wireless communication unit 22 to the head set 2. In accordance with the management of the physical connection management unit 31, the short distance wireless communication unit 2 transmits this disconnection command to the head set 2 (step S116 of FIG. 9). At this time, the disconnection command is transmitted to the head set 2, and also a notification indicating that that this disconnection is a normal disconnection is transmitted to the head set 2. With this configuration, even when the forced interruption of the physical connection by the forced interruption unit 23 is executed, the head set 2 can recognize that this disconnection is a normal disconnection. It should be noted that the "normal disconnection" used herein means a disconnection that can be substantially regarded as a disconnection based on a logical disconnection processing using the logical connection management unit 33.

In step S104, the short distance wireless communication unit 22 receives a disconnection response responding to the disconnection command from the head set 2 (step S117 of FIG. 9). Then, in step S105, the physical connection between the cellular phone 1 and the head set 2 is forcibly disconnected.

In step S106, the link loss notification unit 32 thereafter detects the link loss which is the state of the connection loss with the head set 2 occurred under the weak electric field condition caused when, for example, the distance between the cellular phone 1 and the head set 2 becomes large (the state where the physical connection with the head set 2 is disconnected), and also, in step S107, in a case where the link loss is detected, the logical connection management unit 33 is notified that the disconnection of the physical connection is completed (steps S118 and 119 of FIG. 9).

After that, in step S108, in accordance with the notification from the link loss notification unit 32 indicating that the disconnection of the physical connection is completed, the logical connection management unit 33 uses a predetermined logical connection procedure to execute a disconnection processing of a logical connection between the cellular phone 1 and the head set 2 (step S120 of FIG. 9).

According to the embodiment of the present in invention, when the forced interruption factor is occurred due to the weak electric field, the disconnection of the physical connection with the head set 2 is instructed to the physical connection management unit 31 to disconnect the physical connection with the head set 2. When the disconnection of the physical connection with the head set 2 is completed under the control of the physical connection management unit 31, then the link loss notification unit 32 transmits information indicating that the physical connection has been disconnected is notified to the logical connection management unit 33. With this configuration, without carrying out the normal disconnection procedure by the logical connection management unit 33, the connection with the head set 2 is disconnected. Thus, even in a case of the weak electric field condition with the head set 2, when the forced interruption factor is generated, irrespective of a processing currently executed, the connection with the head set 2 can be disconnected immediately. Therefore, in the case of the link loss under the weak electric field condition with the head set 2, it is possible to avoid a situation where the disconnection of the connection with the head set 2 accompanying the forced interruption factor is delayed as a request of a re-connection is received from the head set 2. As a result, the response of the connection processing between the cellular phone 1 and the head set 2 is improved, and it is also possible to improve the usability when the communication is performed with the head set 2 via the short distance wireless communication.

Figure 10:
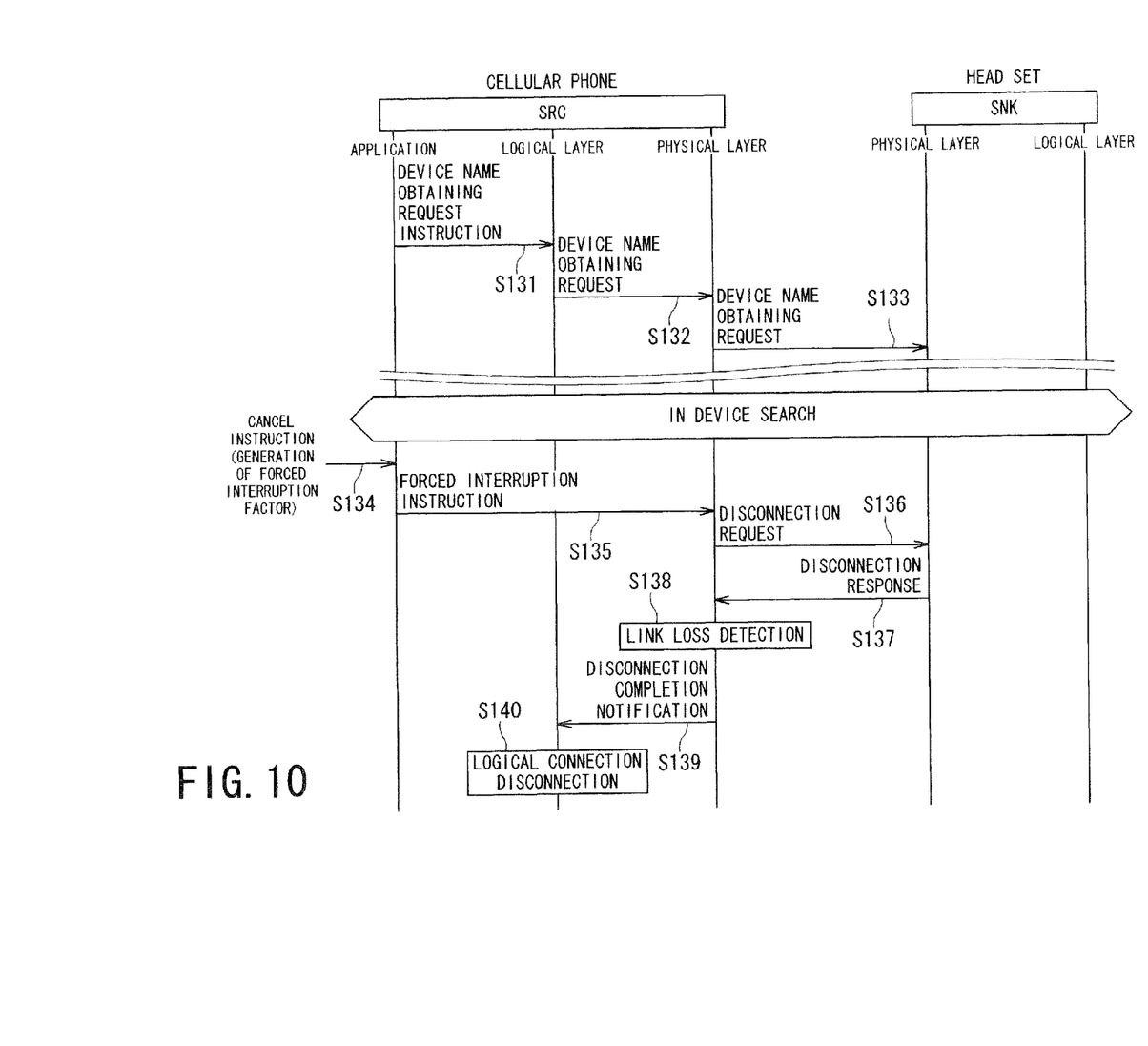
FIG. 10 is a sequence chart for describing another specific sequence performed between the cellular phone and the head set when the forced interruption processing which is described with reference to the flowchart of FIG. 8 is executed.

It should be noted that in the case of the sequence chart of FIG. 9 corresponding to the forced interruption processing which is described with reference to the flowchart of FIG. 8, such a case has been explicitly described that the forced interruption factor such as the incoming call interruption is generated under the weak electric field condition caused when, for example, the distance between the cellular phone 1 and the head set 2 becomes large. However, the present invention is not limited to the above-mentioned case. For example, as illustrated in a sequence chart of FIG. 10, in a case where the device name such as a physical address and assigned name is obtained from the cellular phone 1 under the weak electric field with the head set 2, when the canceling of the device name obtaining is instructed by the user operating the input unit 13 irrespective of that the device name is still being obtained (steps S131 to S134 of FIG. 10), the forced interruption processing may be applied, which is described with reference to the flowchart of FIG. 8, while it is regarded that the forced interruption factor is generated. It should be noted that the processing in steps S135 to S140 of FIG. 10 is basically similar to that in steps S115 to S120 of FIG. 9, and a description thereof will be omitted to avoid the repetition.

Figure 11:
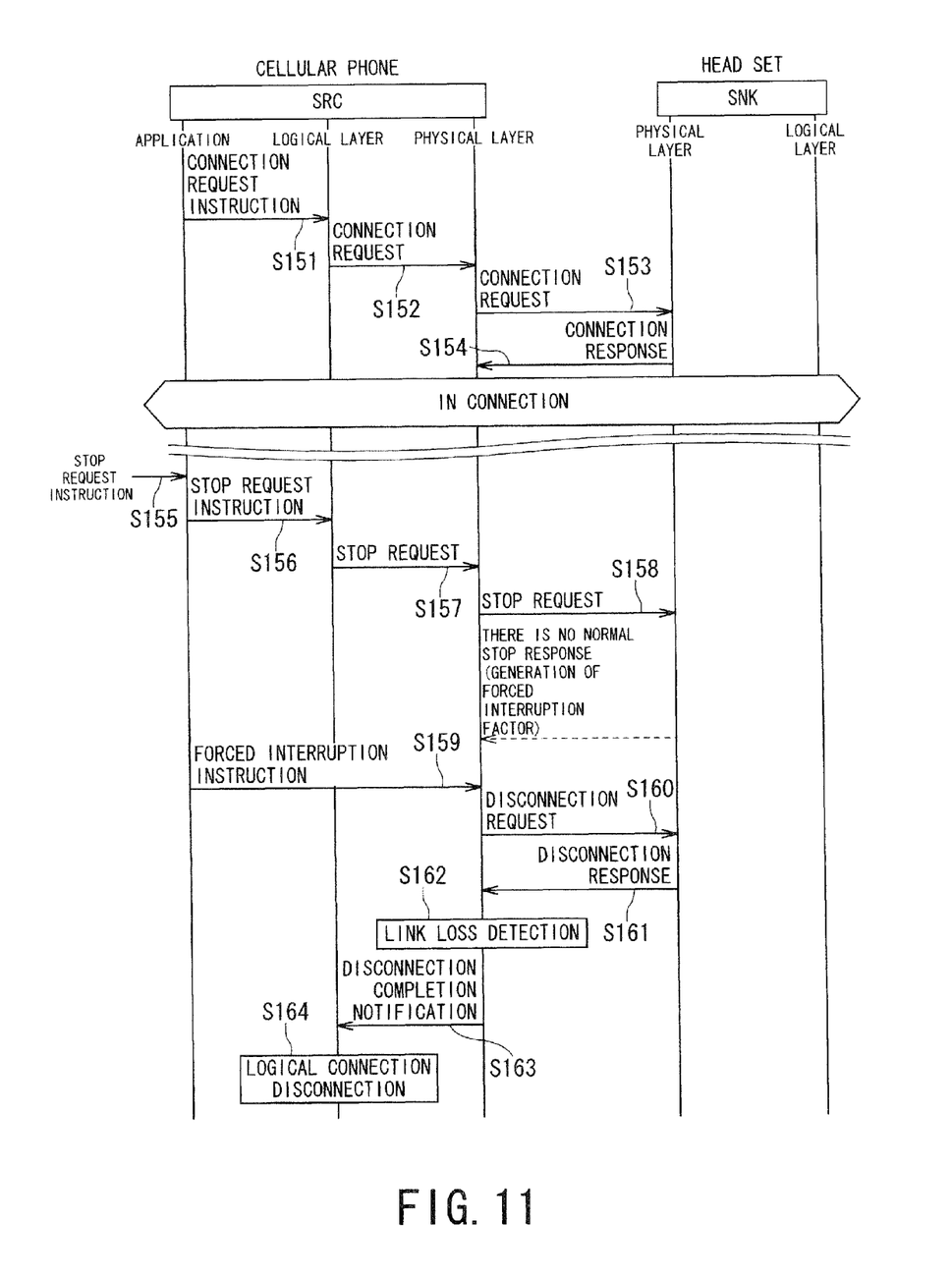
FIG. 11 is a sequence chart for describing another specific sequence performed between the cellular phone and the head set when the forced interruption processing which is described with reference to the flowchart of FIG. 8 is executed.

Also, similarly, for example, in the case as illustrated in the sequence chart of FIG. 11, while it is regarded that the forced interruption factor is generated, the forced interruption processing may be applied, which is described with reference to the flowchart of FIG. 8. To be more specific, in the case of the sequence chart of FIG. 11, after the connection is established between the cellular phone 1 and the head set 2 under the weak electric field condition with the head set 2 (steps S151 to S154 of FIG. 11), when a stop request regarding the data transmission or the like is instructed by the user operating the input unit 13 (steps S155 to S158 of FIG. 11) and when a normal stop response is not transmitted from the head set 2 because the condition with respect to the head set 2 is under the weak electric field, the forced interruption processing which is described with reference to the flowchart of FIG. 8 is executed while it is regarded that the forced interruption factor is generated. It should be noted that the processing in steps S159 to S164 of FIG. 11 is basically similar to that in steps S115 to S120 of FIG. 9, and a description thereof will be omitted to avoid the repetition.

Of course, the forced interruption processing of FIG. 8 may be executed in a case of a forced interruption factor other than the above-mentioned forced interruption factor.

It should be noted that, for example, in the case of the sequence charts of FIGS. 3 to 5, when some data is being transmitted to the head set 2, the forced interruption processing may stand by until the data transmission is completed and be executed after the completion. A forced interruption processing using this method is illustrated in a flowchart of FIG. 12. It should be noted that the processing in steps S171, S172, and S175 to S180 of FIG. 12 is similar to that in step S101 to S108 FIG. 8, and a description thereof will be omitted to avoid the repetition.

Figure 12:
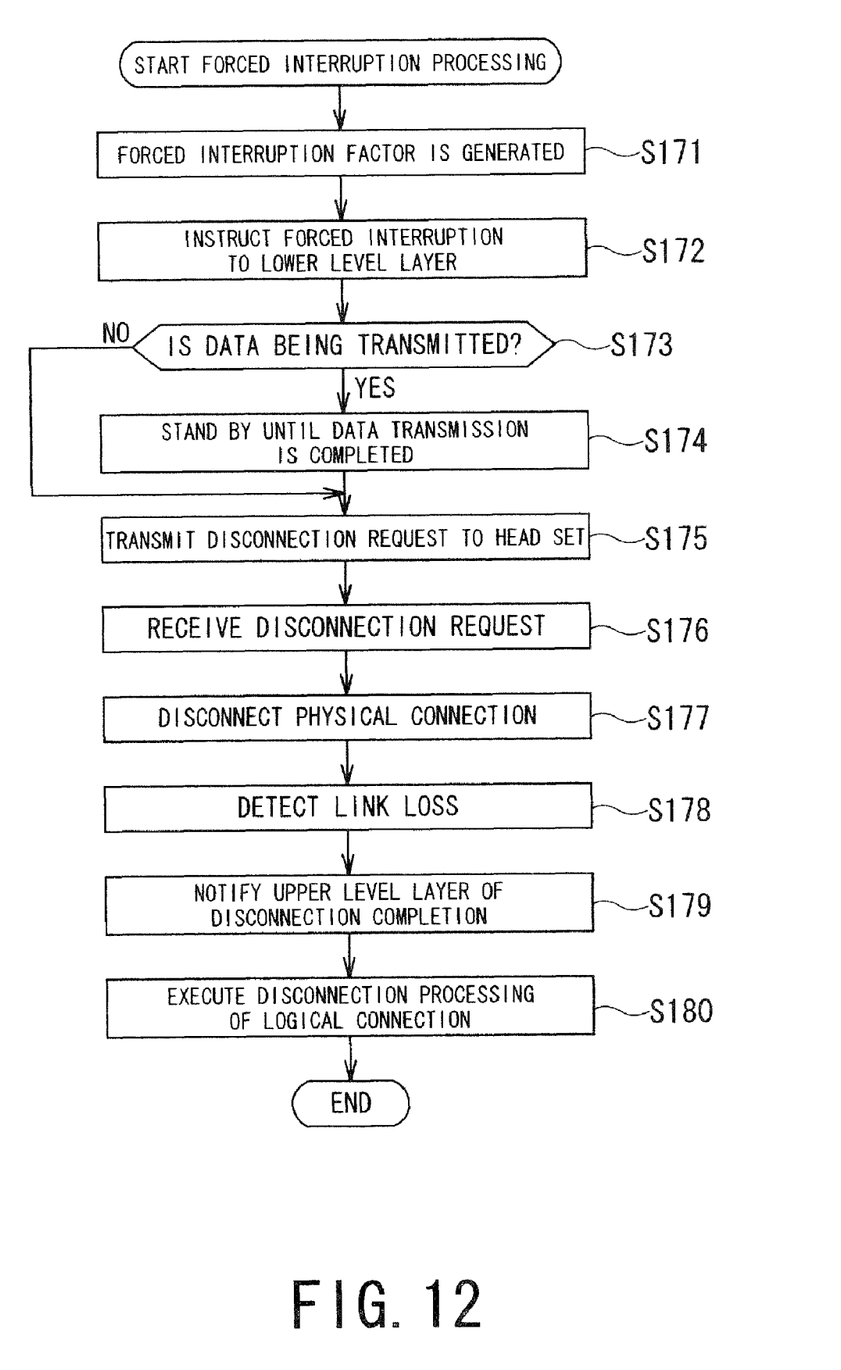
FIG. 12 is a flowchart for describing another forced interruption processing in the cellular phone of FIG. 7.

In the case of FIG. 12, in step S173, when the physical connection management unit 31 receives the forced interruption instruction from the forced interruption unit 23, it is determined as to whether data is currently being transmitted to the head set 2. In step S173, when it is determined that the data is currently being transmitted to the head set 2, in step S174, the physical connection management unit 31 puts in a standby state, the transmission processing of the disconnection request to the head set 2 in accordance with the forced interruption instruction from the forced interruption unit 23, until the data transmission is completed. On the other hand, in step S173, when it is determined that the data is not currently being transmitted to the head set 2, the processing in step S174 is skipped. After that, the processing is advanced to step S175. In step S175, the physical connection management unit 31 carries out the transmission processing of the disconnection request to the head set 2 in accordance with the forced interruption instruction from the forced interruption unit 23. With this configuration, even in a case where the condition is under the weak electric field with the head set 2, when the forced interruption factor is generated, the connection with the head set 2 can be immediately and also appropriately disconnected while a consideration is given on the currently executed processing. As a result, the response of the connection processing between the cellular phone 1 and the head set 2 is further improved, and it is also possible to further improve the usability when the communication is performed with the head set 2 via the short distance wireless communication.

It should be noted that the present invention can also be applied to, in addition to the cellular phone 1, a PDA (Personal Digital Assistant), a personal computer, a portable game machine, a portable music player, a portable video player, and other information processing apparatuses.

In addition, the series of the processing described according to the embodiment of the present invention can be executed by using software but also be executed by using hardware.

Furthermore, according to the embodiment of the present invention, such a processing example has been described that the steps of the flowcharts are processed in a time series manner in the stated order, but the present invention also encompasses a processing in which the steps are not necessarily processed in the time series manner and the steps are processed in a parallel manner or individually processed.

What is claimed is:

1. An information processing apparatus, comprising:
   a session control unit which controls a physical connection and a logical connection with first external device;
   a request management unit which manages a plurality of commands to be handled by the session control unit; and
   an interruption unit which requests the session control unit to disconnect the physical connection with the first external device when a weak electric field condition occurs between the information processing apparatus and the first external device and a connection request is received from a second external device,
   wherein the request management unit skips to store a command which is issued by the interruption unit when the interruption unit detects that the weak electric field condition and the connection request have occurred, and the session control unit disconnects the physical connection,
   wherein the physical connection with the first external device is disconnected without disconnecting the logical connection with the first external device, the disconnection being detected as a link loss, and
   wherein the logical connection with the first external device is immediately disconnected after it is determined that the physical connection with the first external device is disconnected and after the link loss is detected such that the disconnection of the physical connection with the first external device is made to be a normal disconnection state.

2. The information processing apparatus according to claim 1, wherein the interruption unit further requests the session control unit to cancel a running processing between the information processing apparatus and the first external device in accordance with a previous command.

3. The information processing apparatus according to claim 1, further comprising a radio communication unit which communicates with a base station, and
wherein the connection request comprises an incoming call which is received from the base station while a processing is being executed between the information processing apparatus and the first external device.

4. The information processing apparatus according to claim 1, wherein the first external device comprises a wireless head set.

5. The information processing apparatus according to claim 4, wherein the first external device comprises a Bluetooth wireless head set.

6. The information processing apparatus according to claim 4, wherein the information processing apparatus comprises a cellular phone and the second external device comprises a phone.

7. The information processing apparatus according to claim 1, wherein the weak electric field condition occurs between the information processing apparatus and the first external device when the distance between the information processing apparatus and the first external device exceeds a predetermined distance.

8. An information processing apparatus, comprising:
session control means for controlling a physical connection and a logical connection with a first external device;
request management means for managing a plurality of commands to be handled by the session control means; and
interruption means for requesting the session control means to disconnect the physical connection when a weak electric field condition occurs between the information processing apparatus and the first external device and a connection request is received from a second external device,
wherein the request management means skips to store a command which is issued by the interruption means when the interruption means detects that the weak electric field condition and the connection request have occurred, and the session control means disconnects the physical connection,
wherein the physical connection with the first external device is disconnected without disconnecting the logical connection with the first external device, the disconnection being detected as a link loss, and
wherein the logical connection with the first external device is immediately disconnected after it is determined that the physical connection with the first external device is disconnected and after the link loss is detected such that the disconnection of the physical connection with the first external device is made to be a normal disconnection state.

9. The information processing apparatus according to claim 8, wherein the interruption unit further requests the session control unit to cancel a running processing between the information processing apparatus and the first external device in accordance with a previous command.

10. The information processing apparatus according to claim 8, further comprising radio communication means for communicating with a base station, and
wherein the connection request comprises an incoming call which is received from the base station while a processing is being executed between the information processing apparatus and the first external device.

11. The information processing apparatus according to claim 8, wherein the first external device comprises a wireless head set.

12. The information processing apparatus according to claim 11, wherein the first external device comprises a Bluetooth wireless head set.

13. The information processing apparatus according to claim 11, wherein the information processing apparatus comprises a cellular phone and the second external device comprises a phone.

14. The information processing apparatus according to claim 10, wherein the weak electric field condition occurs between the information processing apparatus and the first external device when the distance between the information processing apparatus and the first external device exceeds a predetermined distance.

15. A method for performing request management processing in an information processing apparatus including a session control unit which controls a physical connection and a logical connection with first external device, a request management unit which manages a plurality of commands to be handled by the session control unit, and an interruption unit, the method comprising:
sending a request from the interruption unit to the session control unit to disconnect the physical connection with the first external device when the interruption unit determines a weak electric field condition occurs between the information processing apparatus and the first external device and that a connection request is received from a second external device,
disconnecting the physical connection with the first external device using the session control unit without storing a command from the interruption unit when the interruption unit detects that the weak electric field condition and the connection request have occurred, the physical connection with the first external device being disconnected without disconnecting the logical connection with the first external device, the disconnection being detected as a link loss, and
immediately disconnecting the logical connection with the first external device using the session control unit after it is determined that the physical connection with the first external device is disconnected and the link loss is detected such that the disconnection of the physical connection with the first external device is made to be a normal disconnection state.

* * * * *